United States Patent [19]

Charas et al.

[11] Patent Number: 5,548,813
[45] Date of Patent: Aug. 20, 1996

[54] PHASED ARRAY CELLULAR BASE STATION AND ASSOCIATED METHODS FOR ENHANCED POWER EFFICIENCY

[75] Inventors: Philippe M. Charas, Videvägen; Paul W. Dent, Stehag, both of Sweden

[73] Assignee: Ericsson Inc., Research Triangle Park, N.C.

[21] Appl. No.: 217,301

[22] Filed: Mar. 24, 1994

[51] Int. Cl.[6] .................................................. H04B 7/06
[52] U.S. Cl. ...................... 455/33.3; 455/53.1; 343/890
[58] Field of Search ............................ 343/890, 700 MS; 342/368, 371; 455/33.1, 33.2, 56.1, 54.1, 54.2, 53.1, 33.3; 370/95.3, 18

[56] References Cited

U.S. PATENT DOCUMENTS

| | | | |
|---|---|---|---|
| 4,072,956 | 2/1978 | Provencher | 342/371 |
| 4,101,836 | 7/1978 | Craig et al. | 458/277.1 |
| 4,128,740 | 12/1970 | Graziano | 455/33.1 |
| 4,204,093 | 5/1980 | Yeh | 370/95.3 |
| 4,630,316 | 12/1986 | Vaughan | 343/890 |
| 4,724,441 | 2/1988 | Fithian et al. | 342/368 |
| 4,814,773 | 3/1989 | Wechsberg et al. | 342/371 |
| 4,823,136 | 4/1989 | Nathanson et al. | 342/368 |
| 5,166,693 | 11/1992 | Nishikawa et al. | 342/422 |
| 5,187,807 | 2/1993 | Alard et al. | 455/103 |
| 5,200,759 | 4/1993 | McGinnis | 343/890 |
| 5,276,452 | 1/1994 | Schuss et al. | 342/371 |
| 5,339,086 | 8/1994 | DeLuca et al. | 342/371 |

FOREIGN PATENT DOCUMENTS

| | | |
|---|---|---|
| 0160993A2 | 5/1985 | European Pat. Off. . |
| 0201254A2 | 11/1986 | European Pat. Off. . |
| 2281001 | 2/1995 | United Kingdom . |
| 92/02996 | of 1992 | WIPO . |
| WO93/12590 | 6/1993 | WIPO . |
| WO94/11958 | 5/1994 | WIPO . |

OTHER PUBLICATIONS

International Search Report, PCT/US95/02464, Jun. 19, 1995.

Swales et al., *A Spectrum Efficient Cellular Base–Station Antenna Architecture*, Personal and Mobile Radio Communications Conference, Dec. 9–11, 1991, Coventry, UK, pp. 272–279.

S. P. Stapleton et al., A Cellular Base Station Phased Array Antenna System, IEEE Journal on Selected Areas in Communication, p. 93, 1993.

P. S. Henry et al., A New Approach to High–Capacity Digital Mobile Radio, The Bell System Technical Journal, vol. 60, No. 8, Oct. 1981.

(List continued on next page.)

*Primary Examiner*—Andrew Faile
*Attorney, Agent, or Firm*—Bell, Seltzer, Park & Gibson

[57] ABSTRACT

A base station includes a radio channel generating circuit for generating a plurality of individual radio channel signals each at a different frequency from one another, and a plurality of individual phased array antennas operatively connected to the radio channel generating circuit so that each individual phased array antenna transmits only one individual radio channel signal at a time. Each of the phased array antennas preferably includes a substrate and a plurality of radiating elements mounted thereon in a predetermined pattern. Each radiating element is readily provided by a stripline, and the substrate is preferably a circuit board. Accordingly, another feature of the base station according to the invention is that power radiated by each phased array antenna can be selectively controlled to reduce possible interference while maintaining communications with respective mobile units that are both near and far from the base station. A switch may be provided between the radio channel generating circuit and the phased array antennas to facilitate cell splitting. Method aspects for operating the base station are also disclosed.

58 Claims, 10 Drawing Sheets

OTHER PUBLICATIONS

Carlo Caini, et al, A Spectrum– and Power–Efficient EHF Mobile Satellite System to be Integrated with Terrestrial Cellular Systems, IEEE Journal on Selected Areas in Communications, vol. 10, No. 8, Oct. 1992.

Donald C. Cox, Antenna Diversity Performance in Mitigating the Effects of Portable Radiotelephone Orientation and Multipath Propagation, IEEE Transactions on Communications, vol. COM–31, No. 5, May 1983.

S. A. Bergmann et al., Polarisation Diversity in Portable Communications Environment, Electronics Letters, vol. 22, No. 11, May 1986.

Jean–Francois Lemieux et al., Experimental Evaluation of Space/Frequency/Polarization Diversity in the Indoor Wireless Channel, IEEE Transactions on Vehicular Technology, vol. 40, No. 3, Aug. 1991.

John L. Everett, Potential Developments in Hand–Held Satellite Communication Terminals, Presented at European Satellite Communications 89: Blenheim Online Publications, Pinner, Middx, UK, 1989.

Donald C. Cox et al., Cross–Polarization Coupling Measured for 800 MHz Radio Transmission in and Around Houses and Large Buildings, IEEE Transactions on Antennas and Propagation, vol. AP–34, No. 1, Jan. 1986.

OMNI-DIRECTIONAL    DIRECTIONAL (SECTOR)

PHASED ARRAY CELLULAR BASE STATION AND ASSOCIATED METHODS FOR ENHANCED POWER EFFICIENCY

FIELD OF INVENTION

The present invention relates generally to communications systems and, more specifically, to a cellular radio communications system.

BACKGROUND OF THE INVENTION

Cellular communications systems are commonly employed to provide voice and data communications to a plurality of mobile units or subscribers. Analog cellular systems, such as designated AMPS, ETACS, NMT-450, and NMT-900, have been deployed successfully throughout the world. More recently, digital cellular systems such as designated IS-54B in North America and the pan-European GSM system have been introduced. These systems, and others, are described, for example, in the book titled *Cellular Radio Systems* by Balston, et al., published by Artech House, Norwood, Mass., 1993.

Frequency reuse is commonly employed in cellular technology wherein groups of frequencies are allocated for use in regions of limited geographic coverage known as cells. Cells containing equivalent groups of frequencies are geographically separated to allow mobile units in different cells to simultaneously use the same frequency without interfering with each other. By so doing many thousands of subscribers may be served by a system of only several hundred frequencies.

In the United States, for example, Federal authorities have allocated to cellular communications a block of the UHF frequency spectrum further subdivided into pairs of narrow frequency bands called channels. Channel pairing results from the frequency duplex arrangement wherein the transmit and receive frequencies in each pair are offset by 45 MHz. At present there are 832, 30-KHz wide, radio channels allocated to cellular mobile communications in the United States. To address the capacity limitations of this analog system a digital transmission standard has been provided, designated IS-54B, wherein these frequency channels are further subdivided into 3 time slots.

As illustrated in FIG. 1, a cellular communication system 20 as in the prior art includes one or more mobile stations or units 21, one or more base stations 23 and a mobile telephone switching office (MTSO) 25. Although only three cells 36 are shown in FIG. 1, a typical cellular network may comprise hundreds of base stations, thousands of mobile stations and more than one MTS0. Each cell will have allocated to it one or more dedicated control channels and one or more voice channels. A typical cell may have, for example, one control channel, and 21 voice/data, or traffic, channels. The control channel is a dedicated channel used for transmitting cell identification and paging information. The traffic channels carry the voice and data information.

The MTSO 25 is the central coordinating element of the overall cellular network 20. It typically includes a cellular processor 28, a cellular switch 29 and also provides the interface to the public switched telephone network (PSTN) 30. Through the cellular network 20, a duplex radio communication link 32 may be effected between two mobile stations 21 or, between a mobile station 21 and a landline telephone user 33.

The function of the base station 23 is commonly to handle the radio communication with the mobile station 21. In this capacity, the base station 23 functions chiefly as a relay station for data and voice signals. The base station 23 also supervises the quality of the link 32 and monitors the received signal strength from the mobile station A typical base station 23 as in the prior art is schematically illustrated in FIG. 2 which shows, as an example, the functional components of model number RBS 882 manufactured by Ericsson Telecom AB, Stockholm, Sweden for the CMS 8800 cellular mobile telephone system. A full description of this analog cellular network is provided in publication number EN/LZT 101 908 R2B, published by Ericsson Telecom AB.

A now common sight along many highways, the base station 23 includes a control unit 34 and an antenna tower 35. The control unit 34 comprises the base station electronics and is usually positioned within a ruggedized enclosure at, or near, the base of the tower. Within this enclosure are the radio control group 37, or RCG, an exchange radio interface (ERI) 38 and a primary power supply 41 for converting electric power from the AC grid to power the individual components within the base station 23, and a backup power supply 42.

The ERI 38 provides signals between the MTS0 25 and the base station 23. The ERI 38 receives data from the RCG 37 and transfers it to the MTSO 25 on a dedicated MTS0-BS link 45. In the reverse direction, the ERI 38 receives data from the MTSO 25 and sends it to the RCG 37 for subsequent transmission to a mobile station 21.

The radio control group 37 includes the electronic equipment necessary to effect radio communications. A functional block diagram of an RCG 37 as in the prior art is shown in FIG. 3. The configuration shown illustrates one control channel transmit/receive module (TRM) 51, a number of voice channel TRMs 52, and one signal strength receiver 53, as is a typical configuration required to serve one cell or sector of a cell. Each TRM 51, 52 includes a respective transmitter 54, receiver 55 and control unit 57. The TRMs 51, 52 are not typically frequency agile and operate instead one only one predetermined channel. Control signals from the ERI 38 are received by the individual control units 57. Voice and data traffic signals are routed over a separate interface to the ERI 38.

Each individual transmitter 54 for control and voice is connected to a transmit combiner 58. The transmit combiner combines all of the input signals onto a single output coupled through a coaxial cable 62 to the transmit antenna 63. Through the use of the combiner 58, up to 16 transmitters 54 can typically be connected to a common transmit antenna 63. The combiner 58 is used because there is often a premium for space on the masts and towers used to support the antennas. In an extreme case, one mast may be required to support over 100 radio channels.

The individual transmit signals are amplified before combining and hence the TRMs 51, 52 have relatively high output power to overcome the losses through the transmit combiner 58 and the interconnecting cable 62. Typical TRMs have average output power levels between 10 and 50 watts.

On the receive side, each of two receive antennas 65 is coupled to a respective receive combiner 66A, 66B where the signals received are separated according to frequency and passed on to the individual receivers 55 in each of the TRMs 51, 52. The two receive antennas 65 are typically spaced 3 to 5 meters apart on the tower so that they receive signals with uncorrelated fading patterns to thereby provide space diversity reception. There are many conventional techniques for both pre-detection and post-detection diversity which are described, for example, in Chapter 10 of the book entitled "*Mobile Communications Engineering*", by William C. Y. Lee, published by McGraw-Hill, 1992.

It usually necessary to control the environment within the enclosure for the base station electronics by means of HVAC equipment, that is, heating, ventilation and air conditioning. On average, the typical base station enclosure is about the size of a large truck.

One visible feature of a typical base station 23 is the antenna tower 35. In order to achieve a reasonable coverage area, the antennas 63, 65 are desirably mounted at some distance above the ground. Referring now additionally to the prior art schematic plan view illustration of FIG. 4A, in rural areas the towers 35 are commonly located at the center of a cell 36 thereby providing omni-directional coverage. In an omni-directional cell, the control channel(s) and the active voice channel(s) are broadcast in all areas of the cell— usually from a single antenna. Where base stations 23 are more densely located, a sectorized antenna system may be employed as in the prior art, and shown by the schematic diagram of FIG. 4B. Sectorization requires directional antennas 70 having, for example, a 120 degree radiation pattern as illustrated in FIG. 4B. Each sector 71 is itself a cell having its own control channel(s) and traffic channel(s). Note that "channel" may refer to a specific carrier frequency in an analog system or to a specific carrier/slot combination in a hybrid TDMA/FDMA system, such as IS-54 and GSM.

FIG. 5A illustrates a typical antenna system as in the prior art and as discussed above. FIG. 5B illustrates two types of prior art antennas that have been heretofore discussed—an omni-directional antenna, such as a dipole 66, and a directional sector antenna 70 which further includes a reflector 64, for example. It being understood that transmit and receive antennas are typically of the same type for a given base station.

Thousands of such cellular base stations 23 have been deployed in cell sites worldwide. Currently, the total footprint for a cellular site is quite large. Often surrounded by a chainlink fence, the amount of land required to site a typical base station 23 can be sizable. In most urban areas, the cost of the real estate upon which the site is located is often comparable to the cost of the equipment itself. In addition to the cost of land acquisition, real estate taxes can be a significant operating cost. It would therefore be advantageous to reduce the footprint of a typical cell site.

Also contributing significantly to the operating cost of a cellular base station is the cost of the power consumed. In addition to the HVAC equipment for environmental control, the DC power requirements for generating the RF power may be quite high. The solid state power amplifiers typically located in each TRM 51, 52 operate at between 25% to 65% DC-to-RF efficiency depending upon whether the amplifier is linear or saturated. In addition to the typical transmit combiner 58 loss of 3 to 4 dB, there are significant transmission losses through the coaxial cable 62 from the RCG 37, up the tower 35, and to the transmit antenna 63. It is not unusual to suffer 10 dB or more of total loss through these paths resulting in only 10% of the RF power generated actually being radiated by the antenna.

The use of scanning phased array antennas in cellular communications systems has been proposed. For example, Stapleton, et al., *A Cellular Base Phased Array Antenna System*, Proceedings of the 93rd IEEE VTC, pp. 93–96 describe a circular array of monopole radiating elements to provide 360 degree scanning capability. In order to provide space diversity, Stapleton's antenna is designed such that each radiating element has the potential of transmitting on every channel allocated to the cell.

The use of phased array antennas for narrowband radar has been widespread. With emphasis given to highly focused transmissions of short pulse duration, these so-called solid state, or active, phased arrays usually employ Class C power amplifiers behind each radiating element. In order to develop highly directive beams, a typical array for a search radar may have hundreds, if not thousands of individual radiating elements. Such antennas are discussed at length in Skolnik, *Radar Handbook*, McGraw Hill, 1990, chapters 5 and 7.

It should be noted that passive microstrip arrays are also currently available for use with cellular base stations. For example, type no. 1309.41.0009 manufactured by Huber+Suhner AG of Herisau, Switzerland is a seven element linearly polarized flat panel passive antenna with a shaped elevation beam for use in cellular base stations. This array can replace the typical dipole antenna and is more suitable for locations on the sides of buildings or other flat surfaces. In application note 20.3, published by Huber+Shuner, it is shown that wide area coverage may be obtained via the use of power-splitters whereby portions of the signals are diverted to several individual panels.

Unfortunately, both of the above described phased array antennas require a multi-carrier power amplifier, or MCPA, for simultaneous illumination of a particular sector with two or more frequencies as is common in cellular systems. In a multi-carrier system, intermodulation requirements require spurious noise suppression of greater than –65 dB for third order products. To reduce intermodulation distortion, an MCPA must therefore operate in a highly power inefficient linear mode thereby reducing overall power efficiency.

SUMMARY OF THE INVENTION

In view of the foregoing background, it is therefore an object of the present invention to provide a cellular communications system base station and associated method addressing the practical problems of increasing power efficiency and reducing cell site size.

It is also an object of the present invention to provide a base station and associated method for facilitating the use of active phased array antennas, while reducing radiation of spurious signals, such as intermodulation products.

These and other objects, advantages and features of the present invention are provided by a base station including radio channel generating means for generating a plurality of individual radio channel signals each at a different frequency from one another, and a plurality of individual phased array antennas operatively connected to the radio channel generating means so that each individual phased array antenna transmits only one individual radio channel signal at a time. Accordingly, intermodulation products are considerably reduced as compared to a phased array transmitting multiple radio channels at different frequencies at one time. Moreover, the present invention permits individual amplifiers to be incorporated into the phased array antennas to thereby considerably reduce cable transmission losses associated with delivering RF power to a conventional antenna, for example. The overall improvement of DC-to-RF efficiency reduces the size of the required equipment power supply and lessens the thermal management problem, thereby also reducing operating costs and improving system reliability.

Each of the phased array antennas preferably includes a substrate and a plurality of radiating elements mounted thereon in a predetermined pattern. Each radiating element is preferably provided by a stripline, and the substrate is preferably a circuit board. Accordingly, another feature of the base station according to the invention is that power radiated by each phased array antenna may be selectively controlled to reduce the difficulties associated with communicating with respective mobiles that are both near and far from the base station. More particularly, the base station preferably includes signal quality receiver means for receiving a signal from a mobile unit relating to the signal quality received at the mobile unit, and further includes antenna power control means for selectively operating predetermined ones of the radiating elements in each respective phased array antenna responsive to signal quality received at the mobile unit. Alternately, signal strength may be sensed at the base station. Thus, the radiated power and or beamwidth from the antenna may be selectively controlled to maintain a sufficient received power level at the mobile for good communications, yet not deliver so much power, particularly for a near mobile, to create an unnecessary likelihood of interference, for example.

The radio channel generating means may preferably be located adjacent the lower portion of the base station antenna tower, and linking means, such as coaxial cables may be used to deliver the radio channel signals to the phased array antennas. Alternately, the radio channel generating means may be located on the tower or manufactured integral with the phased array antennas to further reduce RF power losses.

The base station also preferably includes a receive antenna positioned adjacent the transmit phased array antennas. The receive antenna is also preferably a phased array antenna capable of receiving a plurality of individual radio channel signals each at a different frequency from one another from a plurality of mobile units. Accordingly, the receive antenna may also preferably include a combining network mounted thereon and connected to the receive antenna elements for coherently coupling signals received thereby, and a low noise amplifier mounted on the antenna and connected to the combining network for amplifying a signal therefrom.

The base station also preferably includes modulator means for modulating a plurality of radio frequency carriers with respective input or information signals to thereby generate the plurality of individual radio channel signals. In one embodiment, the input signals may be time division multiplexed into time slots of repetitive multiplex frames.

Yet another advantageous feature of the present invention is that a switch may be provided between the radio channel generating means and the phased array antennas, such as to facilitate cell splitting. More particularly, the switch is movable between first and second positions so that in the first position the switch couples together two or more predetermined phased array antennas for increasing radiated antenna power for a respective radio channel signal. In the second position, the switch decouples the two or more predetermined phased array antennas and facilitates increasing radio channel capacity for the base station, that is, splitting the cell.

Method aspects of the present invention relate to operating the base station as described above. One method is for operating the base station for enhanced power efficiency and includes the steps of: generating a plurality of individual radio channel signals each at a different frequency from one another; and operating each individual phased array antenna to transmit only one individual radio channel signal at a time. Accordingly, active phased array antennas may be used to reduce losses typically associated with delivering RF power from the ground to an antenna mounted on a tower as in conventional cellular communications systems.

Another method aspect relates to controlling the radiated output power of the phased array antennas and includes the steps of: generating a plurality of radio channel signals and transmitting same via at least one phased array antenna, receiving a signal from a mobile unit relating to received signal quality at the mobile unit, and selectively operating predetermined ones of the radiating elements responsive to sensed signal strength from the mobile unit. Accordingly, a desired amount of power or desired beamshape may be produced to ensure communications while reducing the likelihood of unnecessary interference.

Another method aspect relates to facilitating cell splitting as is typically required as the number of mobile units increases in a given cell. The method includes the steps of: generating a radio channel signal and delivering same to two or more predetermined phased array antennas coupled together for increasing radiated antenna power for the radio channel signal; and later decoupling the two or more predetermined phased array antennas and operating the two or more predetermined phased array antennas with respective different radio frequency channels to thereby increase the radio channel capacity for the base station.

BRIEF DESCRIPTION OF THE DRAWINGS

These and other features and advantages of the present invention will be readily apparent to one of ordinary skill in the art from the following written description, read in conjunction with the drawings, in which.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Although the proposed invention may be used with any known cellular or land-mobile radio transmission standard, it is envisaged that it may be particularly suitable for use with the pan-European GSM system. Therefore, where appropriate, specific examples presented herein will be directed towards a GSM implementation. This is done to ensure that the description of the preferred embodiments will be readily understood by those skilled in the art, while those skilled in the art will appreciate that the present invention can be easily and readily adapted to different transmission standards.

First, a proposed base station in accordance with the invention will be described. Following this, a detailed description will be provided illustrating how to advantageously use the proposed base station in a cellular communications system.

Figure 6:
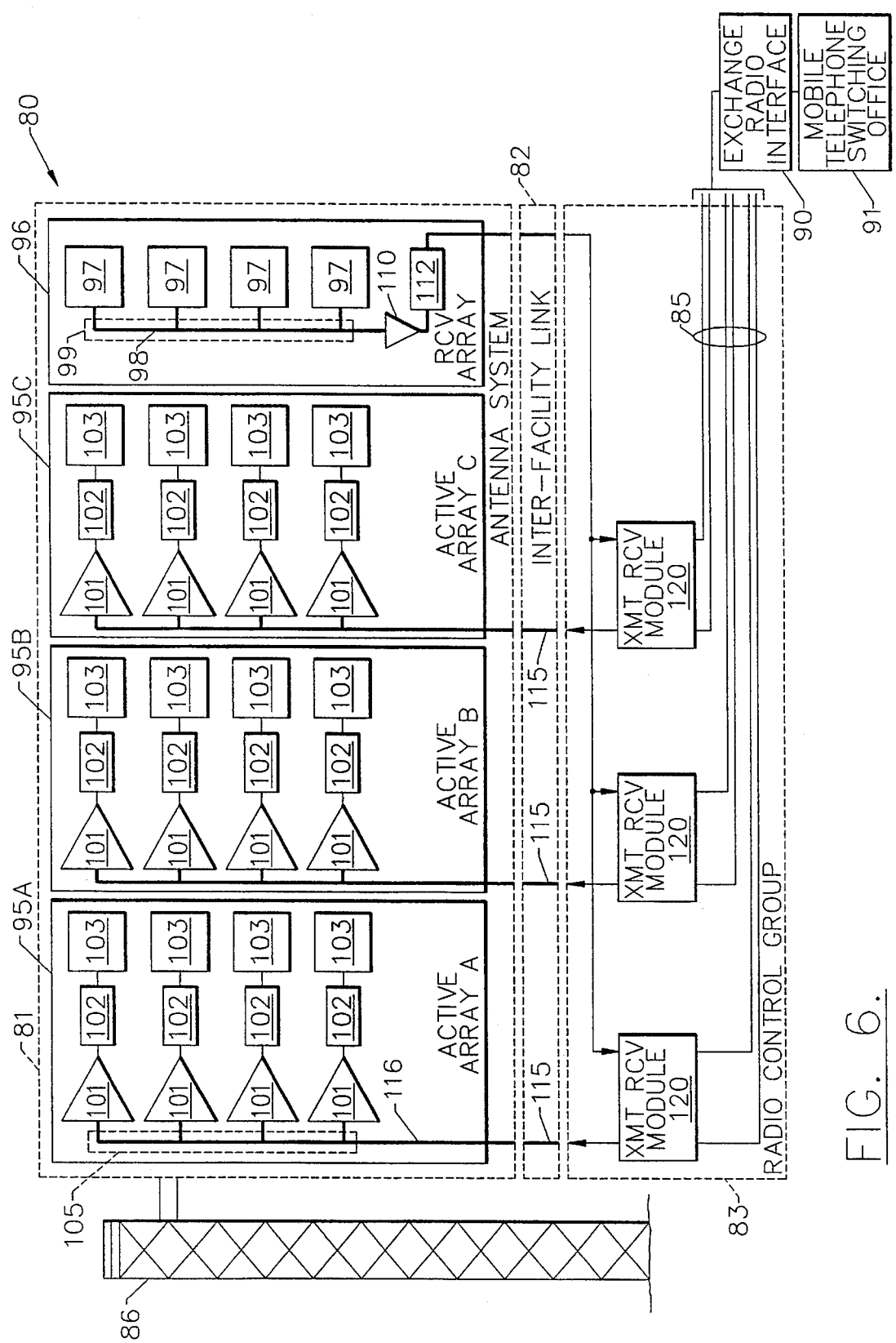
FIG. 6 is a schematic block diagram illustrating a cellular communications system base station according to the present invention.

Referring first to FIG. 6 there is shown an embodiment of the base station 80 according to present invention configured for an exemplary arrangement covering one sector with three carrier frequencies. This particular arrangement is chosen due to its simplicity and is not intended to be limitative. It is envisaged, for example, that a typical base station may have 8 or more carriers and therefore 8 or more transmit antennas per sector/cell. From the following description of this example those of skill in the art will readily be able to extend this example configurations having many carriers and/or many sectors/cells.

The base station 80 includes an antenna system 81, an interfacility link (IFL) 82, and the radio control group (RCG). The RCG 83 is preferably a rack mounted assembly which in one embodiment is physically separated from the antenna system 81 via the IFL 82. The RCG provides the radio channel generating means for generating a plurality of individual radio channels at different frequencies. The IFL 82 provides linking means and preferably includes a bundle of coaxial cables, power cables, and control wires, and is typically a few tens of meters in length. It is envisaged that the base station 80 in this embodiment will have the RCG 83 located on the ground and housed in an environmentally shielded enclosure.

The antenna system 81 will typically be positioned on a tower 86 or otherwise elevated above the ground. It is also possible to have the RCG 83 located intermediate on the tower or itself incorporated into the antenna system 81. If the RCG 83 is to be so located, careful consideration should be given to providing adequate lightning protection, as would be readily understood by those skilled in the art.

In either arrangement, the RCG outputs 85 are interfaced to a conventional exchange radio interface (ERI) 90 and subsequently to the MTSO 91 and to the remainder of the network via conventional means as would be readily understood by those skilled in the art. In fact, it is envisaged that the proposed base station 80 may be used to upgrade existing cellular systems by replacing an existing antenna system, conventional IFL and RCG with the components as described herein. The new RCG 81 may therefore plug directly into the inputs of an existing ERI.

The base station 80 according to the present invention uses a single carrier per active array. As shown in the illustrated embodiment of FIG. 6, the base station 80 includes three separate active array antennas or panels 95A, 95B and 95C for transmitting one each of three frequencies assigned to the sector/cell. The base station 80 also includes a single receive antenna 96 capable of receiving all of the transmit frequencies.

Each active array panel includes a plurality of RF power amplifiers 101 each coupled through a filter 102 to an individual radiating element 103. Power is distributed to each power amplifier 101 via a power dividing network schematically illustrated only for active array A 95A by the dotted block labelled 105. In this embodiment, the above-mentioned components are preferably fabricated using stripline or microstrip techniques on a mounting substrate, such as a glass-epoxy printed circuit board, as would be readily understood by those skilled in the art.

The power divider 105 is a network for distributing RF power from a single input to several outputs and may preferably be a Wilkinson power divider, branch-guide or edge-coupled divider, or other well-known power division devices, such as described in Chapter 5 of Bahl, et al., *Microwave Solid State Circuit Design,* Wiley & Sons, 1988. The power divider 105 is preferably designed to provide phase coherent outputs to each power amplifier 101. The input power may be equally divided and in-phase among all of the power amplifier 101 inputs; this is known as uniform illumination and produces a symmetrical radiation pattern. Alternatively, small power imbalances and/or phase offsets can be provided if it is desired to shape the radiation pattern in accordance with basic array theory. A discussion of phase offsets and power imbalances may be found in Part 2 of Brookner, *Practical Phased-Array antenna Systems,* Artech House, 1991. Another reference on the basics of array theory can be found in Chapter 7 of Skolnik, *Radar Handbook* 2nd Ed., McGraw Hill, 1990.

In the illustrated embodiment, the power amplifier 101 may preferably be a 1–2 watt device such as part number GT-1867 manufactured by GigaTec, Inc. of 942-1 Shimo-satomi Haruna-machi Gunma-gun Gunma-ken 370-33 Japan. The power amplifier 101 is desirably suitable for integration to a microstrip circuit and may be operated in a saturated or linear mode depending upon whether the modulation of the RF signal is respectively of constant or non-constant envelope. For an analog system using frequency modulation, the amplifier may be operated as a saturated Class C device having high DC-to-RF efficiency. For certain digital modulations, for example π/4 shifted DQPSK, the amplifier 101 is preferably operated as a linear Class A device having lower DC-to-RF efficiency, but producing an amplified replica of the envelope variations of the input signal.

The power amplifiers 101 may produce wideband noise outputs at frequencies overlapping the receive frequency band. These may be of such a level as to degrade the noise figure of the receive amplifier 110. To improve the spectral purity of the transmitted signal, the output of each power amplifier 101 is preferably coupled to a respective filter 102. The filter 102 is preferably a microstrip notch filter, such as described in Chapter 6 of Bahl, et al., *Microwave Solid State Circuit Design*, Wiley & Sons, 1988. The filter 102 preferably attenuates signals that overlap the receive frequency band. Depending upon the system bandwidth and frequency assignment, the filter 102 may also preferably be a bandpass filter with the pass band centered about the transmit frequency. Alternatively, a low-pass or high-pass filter may also be appropriate.

The output of each filter 102 is illustratively coupled to a respective radiating element 103 which may preferably be a linearly-polarized microstrip patch antenna such as described on pages 7-1 to 7-14 of Johnson, et al., *Antenna Engineering Handbook—2nd Edition*, McGraw-Hill, 1984. Alternatively, a circularly polarized patch antenna, such as described on pages 7-14 to 7-16 of the aforementioned reference may equivalently be used.

In the illustrated embodiment of the base station 80, the transmit active array panels 95A, 95B and 95C are preferably identical. The receive array panel 96 is preferably an antenna array formed from microstrip patch elements 97. As with transmit active array panels, the receive panel 96 is preferably constructed from a glass-epoxy circuit board using stripline or microstrip techniques, as would be readily understood by those skilled in the art. The antenna elements 97 are again preferably microstrip patch radiators as described above. The patch antenna elements 97 are preferably linearly polarized patch antenna elements. It is preferred if both the transmit and receive panels exhibit the same polarization—normally vertical linear polarization.

The receive antenna elements 97 are coupled to a common transmission line 98 via a combining network 99. Basically the inverse of power dividing network 105, the combining network 99 coherently couples the signals received from array elements 97 into a common output. As before, the combining network 99 may introduce phase offsets or tapered coupling in order to effect beam shaping or to reduce sidelobes.

The output of combining network 99 is illustratively coupled to a low-noise amplifier (LNA) 110. Traditionally, a similar LNA was located in the RCG of a conventional base station, and, accordingly, the received signal suffered 2-4 dB of transmission loss through the IFL cabling. By locating the LNA 110 on the receive antenna panel 96 in accordance with another advantage of the present invention, losses prior to amplification are reduced thereby benefitting the overall system noise figure and enabling the receive antenna gain to thus be reduced.

The amplified receive signal from the LNA 110 is also preferably filtered to remove unwanted signal components, such as those generated by the power amplifiers 101. Therefore the output of LNA 110 is preferably coupled to bandpass filter 112. The bandpass filter 112 may preferably be a microstrip edge coupled filter, such as described in Chapter 6 of Bahl, et al., *Microwave Solid State Circuit Design*, Wiley & Sons, 1988. Depending on the system bandwidth and channel spacing, a low-pass, or high-pass filter may also be acceptable as would be readily understood by those skilled in the art.

Both the transmit signals and the receive signals are coupled to/from the antenna system 81 via an interfacility link (IFL) 82. In the illustrated embodiment, the IFL preferably comprises a bundle of coaxial cables 115, and power cables (not shown) to provide power to the power amplifiers 101 and the LNA 110.

Figure 7:
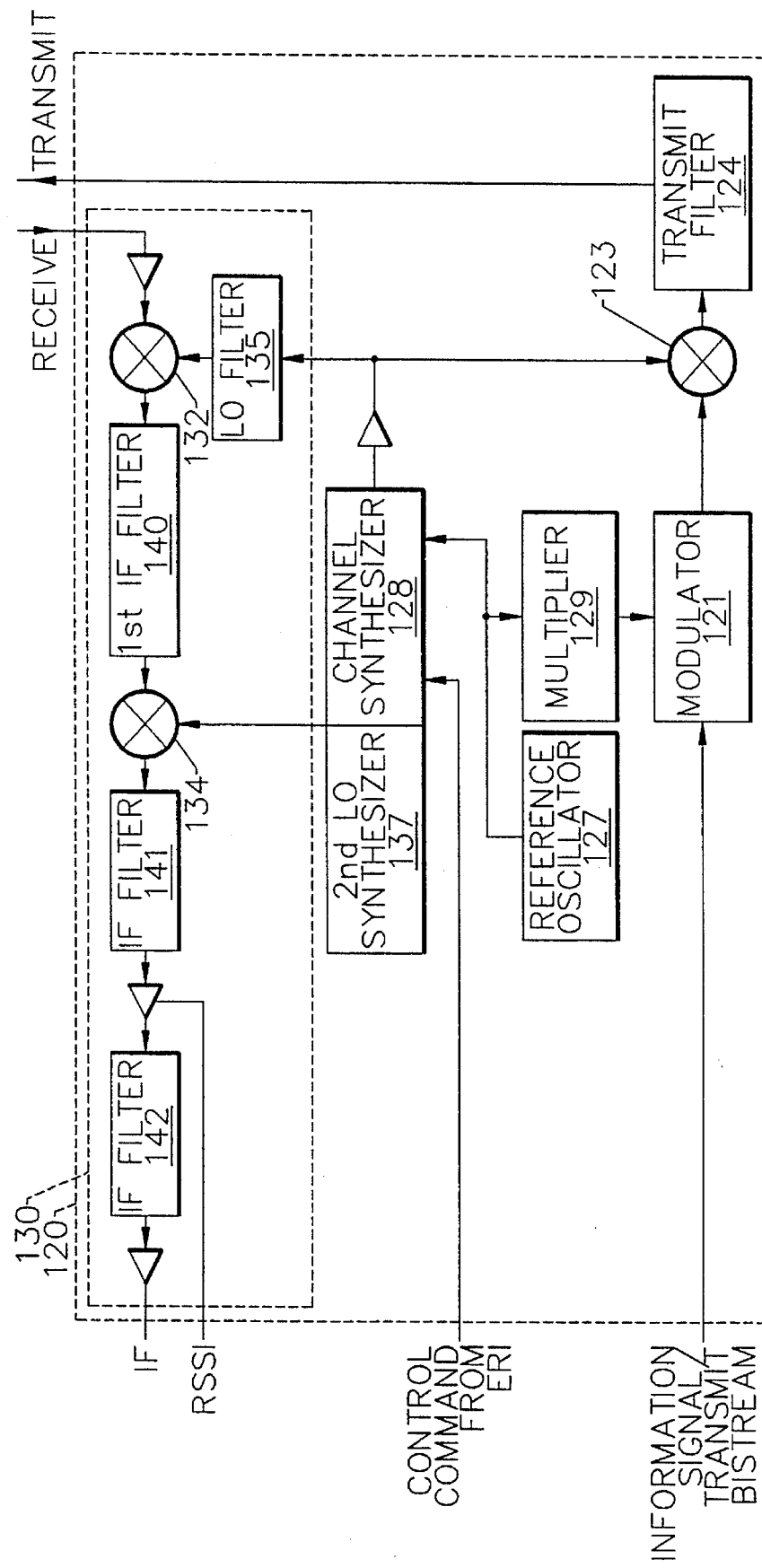
FIG. 7 is a schematic block diagram of a transmitter/receiver module used in the base station according to the present invention.

The radio control group 83 preferably includes a plurality of transmit/receive modules (TRMs) 120. Referring now additionally to FIG. 7, the TRM 120 is explained. The TRM 120 preferably comprises the RF hardware and electronics necessary to effect conversion of an information signal to an RF output and vice versa for a receive signal. The information signal is preferably digitized to a bitstream comprising a sequence of digital phase and/or phase and amplitude information and is received from the ERI by conventional means. For GSM cellular systems, the information signal represents a GMSK waveform. For IS-54 systems, the information signal represents a π/4 shifted DQPSK waveform. The generation of both of these types of signals would be readily understood by those skilled in the art, as would other modulation techniques.

The information signal is coupled to a modulator 121 where the phase, amplitude and/or phase and amplitude information are impressed upon a reference frequency to create a baseband signal coupled to a mixer 123 where it is mixed with a predetermined RF carrier frequency generated by a reference oscillator 127 and channel synthesizer 128. The reference oscillator 127 is also coupled to the modulator 121 via the multiplier 129 in the illustrated embodiment. The RF carrier frequency is selected responsive to commands which are obtained from the ERI. The output of the mixer 123 is coupled to a transmit filter 124 to remove unwanted mixer products. After filtering, the modulated RF carrier is coupled via coaxial cable 115 illustratively defining the IFL 82 to the transmission line 116 on the active array panel 95A where it is radiated as described above (FIG. 6). An identical process, at a separate carrier frequency, occurs in each of the other TRMs.

Still referring to FIG. 7, signals received from the receive array panel 96 are coupled to a receiver circuit 130 where the modulated RF carrier is downconverted to a baseband signal and demodulated by the illustrated arrangement of first and second mixers 132, 134, respectively, driven respectively via a local oscillator and associated local oscillator filter 135, and by a second local oscillator synthesizer 137, respectively. Three IF filters 141–142 are also shown in the illustrated embodiment for downconverting the receive signal to baseband and demodulating the downconverted signal. Accordingly, two signals are generated: an IF signal and a received signal strength indicator (RSSI) signal as illustrated.

In FIG. 7 is shown an arrangement suitable for demodulating a π/4 shifted DQPSK signal. An example of such a demodulation technique is described, for example, in U.S. Pat. No. 5,048,059 entitled "Log-Polar Signal Processing" to Dent and assigned to the present assignee, the disclosure of which is hereby incorporated herein by reference. One skilled in the art can readily observe that a GMSK demodulator, or other, may be used.

Output from the receiver circuit 130 is an information signal which may be processed in the TRM 120 or passed through to the ERI for subsequent processing according to conventional techniques. A similar process, at a receive frequency corresponding to the respective transmit frequency occurs in all of the TRMs 120.

Figure 8:
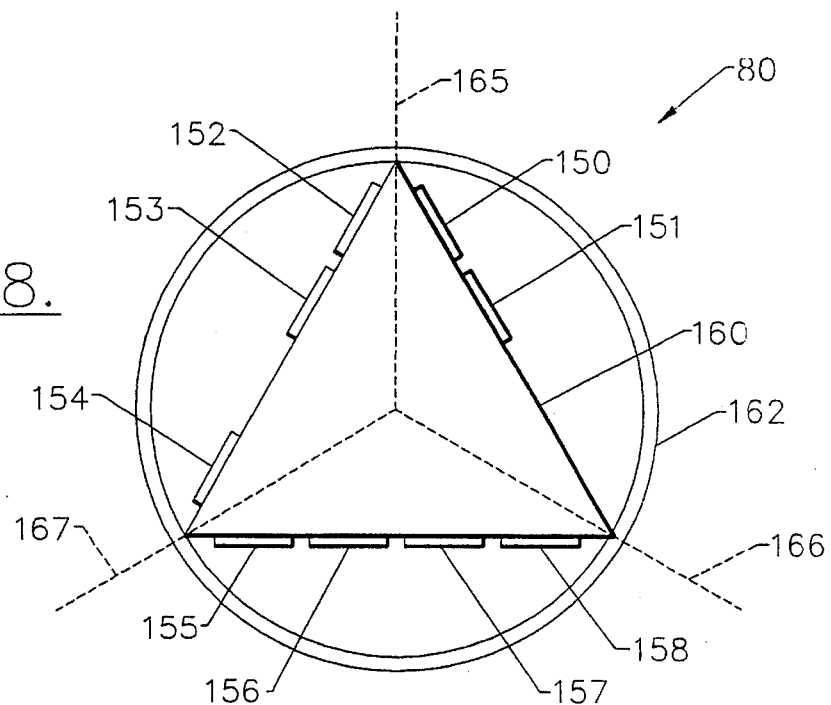
FIG. 8 is a schematic plan view illustrating a typical arrangement of antennas in accordance with the invention having three sectors served by one, two, and three carrier frequencies each.

FIG. 8 is a schematic plan view illustrating an exemplary arrangement for using the proposed base station 80 heretofore described. This arrangement provides omni-directional coverage by dividing a cell into three sectors each having, for example, a different number of frequencies allocated. Transmit phased array active antennas 151, 152, 153, 155, 156 and 157 are located on a triangular mount 160 and oriented to provide sectorized coverage. A conventional radome 162 provides protection from the environment. Sector 1 is defined as approximately that region between line 165 and line 166 and is illuminated by phased array antenna 151. Sector 2 is defined as approximately that region between line 166 and line 167. Sector 2 is illuminated by three phased array antennas: 155, 156, and 157. Sector 3 is defined by that region between lines 167 and line 165 and is illuminated by two phased array antennas 152 and 153.

In a single carrier per channel system, such as the US AMPS system, that is, IS-553, one frequency is preferably assigned to each phased array antenna in accordance with the invention. For this example, a first frequency is assigned to antenna 151, a second, third, and fourth frequency are each assigned to antennas 155, 156, and 157 respectively, and a fifth and a sixth frequency are assigned to antennas 152 and 153, respectively. Frequency assignment is determined by the MTSO which provides control signals via the ERI to the respective TRM associated with each antenna as previously described. Although it is possible that the individual frequency assignments may be dynamically changed, each antenna does not transmit more than one frequency at any moment in time.

Figure 9:
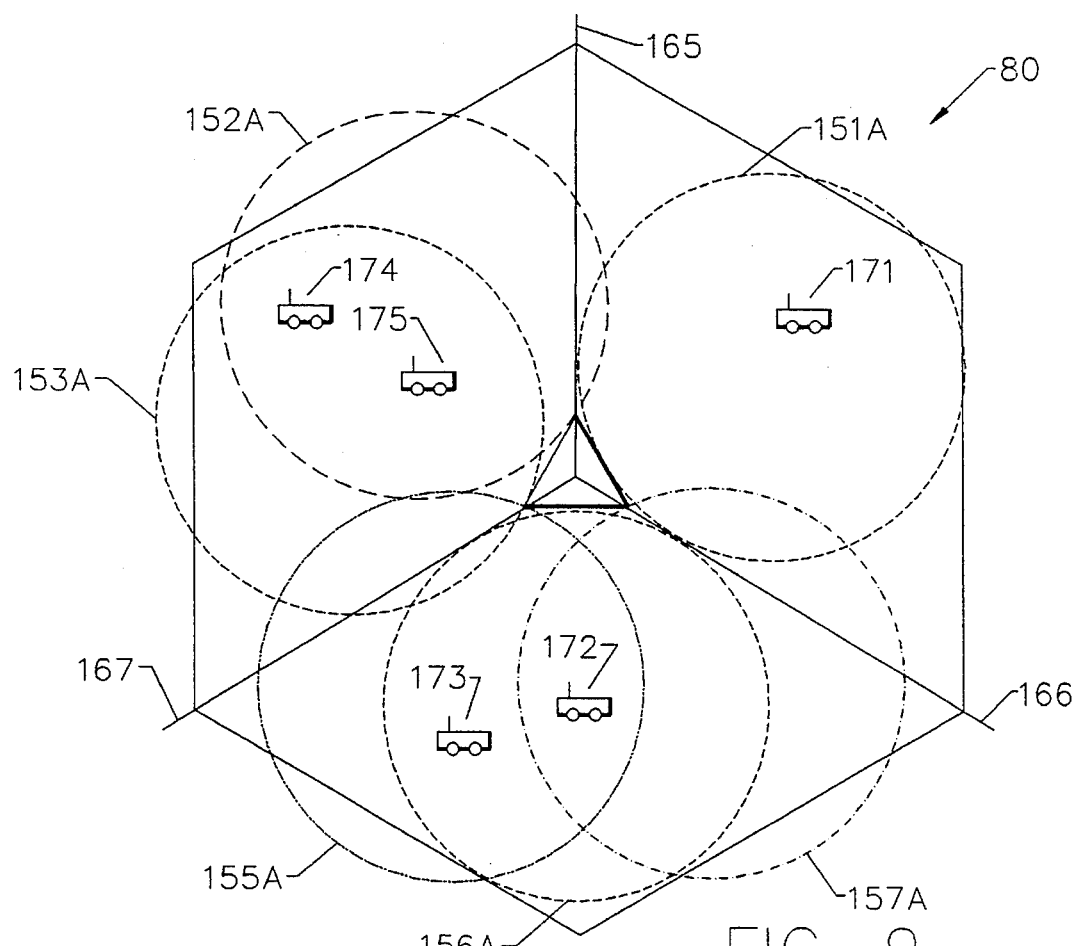
FIG. 9 is a schematic plan view of theoretical downlink coverage patterns as produced by the arrangement shown in FIG. 8.

In FIG. 9 is shown a theoretical coverage pattern produced by the antenna system of FIG. 8 wherein the respective coverage areas for each transmitter are indicated by the respective antenna numerals with an "A" suffix. According to the present invention, a mobile station 171 may receive downlink signals on a first frequency transmitted from antenna 151. The uplink signals transmitted from mobile station 171 will be received by the phased array antenna 150. Note that the patterns (not shown) of receive antennas 150, 154, and 158 preferably have sufficient beamwidth to cover their entire respective sectors. In Sector 2, mobile station 172 may receive downlink signals from all three antennas in this sector. Therefore, mobile station 172 may be tuned to receive a downlink signal on a second frequency from antenna 155, a third frequency from antenna 156, or a fourth frequency from antenna 157. Mobile station 173 is shown outside the coverage area of antenna 157 so it must be tuned to receive a downlink signal at a second frequency from antenna 155, or a third frequency from antenna 156. The uplink signals transmitted by mobile stations 172 and 173 are both received by receive antenna 158. The received signals are coupled to the TRMs in the RCG and processed as described in greater detail above.

Figure 10:
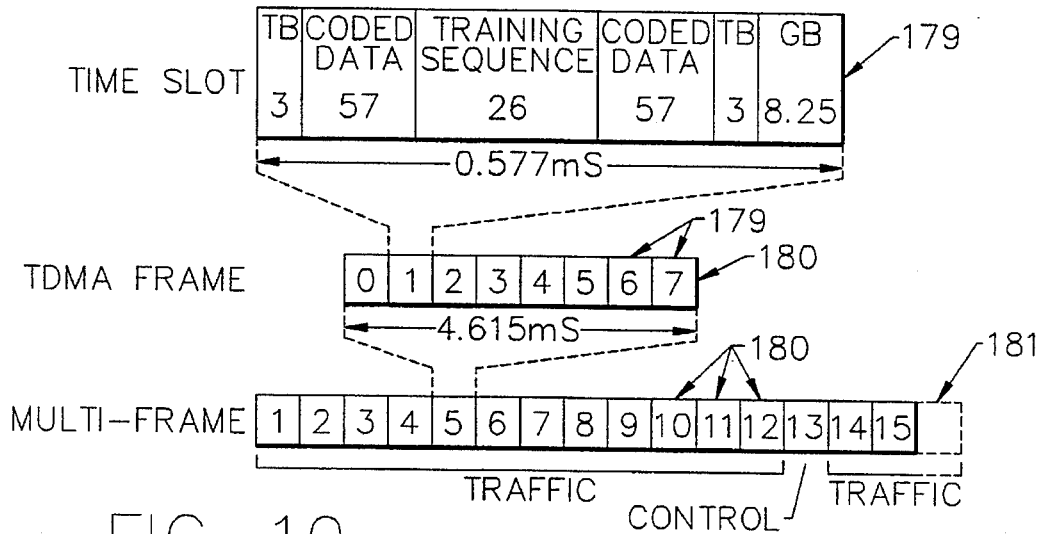
FIG. 10 is schematic block diagram illustrating the relationship between the slots, frames, and multiframe transmission in GSM as in the prior art.

In a TDMA system, such as the pan-European GSM system, each carrier is divided into several time slots 179. An illustration of the prior art GSM frame structure is shown in FIG. 10 and includes a multiframe 181 divided into a series of TDMA frames 180, in turn, divided into a series of time slots 179, as would be readily understood by those skilled in the art. As shown in the TDMA frame 180 there are eight time slots numbered 0 through 7. Therefore up to eight mobile stations can occupy a given carrier frequency. In FIG. 9, for example, mobile station 171 and seven other mobile stations (not shown) can be served from antenna 151. Similarly, in sector three mobile stations 174 and 175 may occupy different slots of the same frequency transmitted from antenna 152 or antenna 153. It can also be observed that mobile station 174 may occupy, for example, a time slot transmitted on a first frequency by antenna 152 and that mobile station 175 may also occupy the same time slot transmitted on a second frequency by antenna 153.

Figure 11:
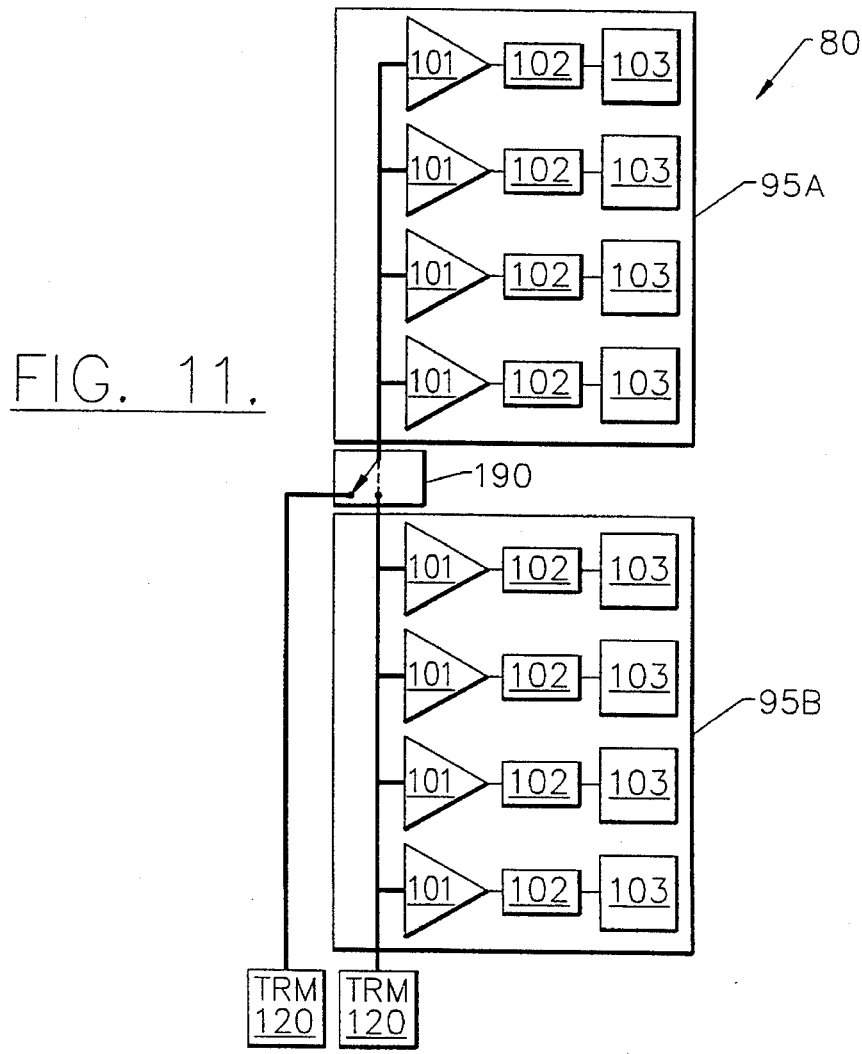
FIG. 11 is a schematic block diagram of an embodiment of the base station according to the invention illustrating how capacity and radiated power may be traded to facilitate cell splitting.

In FIG. 11 there is shown another aspect or feature in accordance with the present invention. Therein is illustrated an arrangement of two transmit phased array active antennas 95A and 95B connected via a single pole double throw, or SPDT, switch 190. Upper antenna 95A and lower antenna 95B may be identical to the description given above. For clarity, the IFL 82 and the RCG 83 are not shown in FIG. 11. There are two TRMs 120 also as described above and connected to the ERI.

It will be readily appreciated by those skilled in the art, that the effective radiated isotropic power, or EIRP, for a phased array antenna is a function of the power transmitted by each radiating element 103, the number of elements, and the gain of the antenna. For example, if each radiating element 103 has a 600 milliWatt power amplifier 101 coupled thereto, and the radiating element has 11 dBi gain, then each of the upper and lower antennas 95A, 95B, respectively, have approximately 100 Watts EIRP. Connected together as when switch 190 is closed they form effectively a single antenna having approximately 400 Watts EIRP.

In the initial deployment of new cellular coverage there are often relatively few cell sites each having wide regions of coverage, that is, large cell diameters. As the number of subscribers increase, cell splitting is desirable. Cell splitting is the process by which cell sizes are decreased and frequency-reuse is increased. The general approach is described, for example, on pages 301–306 of W. C. Y. Lee, *Mobile Cellular Telecommunications Systems*, McGraw Hill Book Company, 1989.

In the initial deployment of a cellular communications system, a base station 80 including an antenna configuration such as shown in FIG. 11 may be erected. The system will first be designed with relatively large cell sizes. In this situation, for example, a single frequency with a high EIRP is required and the switch 190 preferably has an arm coupled to pole thereby connecting the upper and lower antennas, 95A, 95B together with one TRM as shown by the dotted switch position, thereby forming effectively one antenna having a higher EIRP.

As the number of subscribers increases, the base station 80 has the built-in capability to trade cell size for capacity. This is accomplished by adding another TRM shown on the left of FIG. 11 into the RCG and moving the switch 190 to the position indicated by the solid line. In this configuration, the left TRM 120 is connected to the upper antenna 95A and the right TRM is connected to the lower antenna 95B. Each TRM is tuned to a different transmit frequency as previously described. By so doing, without requiring any change to the antenna system other than resetting switch 190, a single antenna having 400 Watts EIRP is changed to two antennas each having 100 Watts EIRP. As would be readily apparent to one skilled in the art, increasing the number of frequencies and reducing the transmit power increases the system user capacity.

In any cellular communications system there is a so-called "near/far" problem. For example, referring back to FIG. 4A, there is shown in cell 36 two mobile stations 21. One mobile station is located close the base station while the other is located at the periphery of the cell far removed from the base station. To reduce interference, it is desirable to transmit downlink (and uplink) signals with just enough power to meet the sensitivity requirement of the respective receivers. Therefore, it is desirous to transmit to a near mobile station at a much lower power level than to a far mobile station.

In a cellular telephone system employing digital communications, signal quality may be a more important factor than received signal strength. It is a distinct advantage in TDMA systems, such as IS-54B and GSM, that a mobile station may perform signal quality measurements during otherwise inactive time slots. Most often these measurements are used to determine whether or not a handover to another frequency is necessary. Such a method is known as mobile assisted hand-over, or MAHO, and is well known to those skilled in the art and is described, for example, in Section 3.4.6 of the IS-54B Specification. According to another aspect of the present invention, the signal quality measurements performed by the mobile station may also form the basis for determining the required amount of power transmitted by the base station. Indeed since it is signal quality and not simply signal strength that is typically measured, the power transmitted by the base station may be optimized if these signal quality measurements are used. Signal quality measurements are performed in the usual manner and the transmit power of the array antenna may be adjusted as will now be described.

Figure 12:
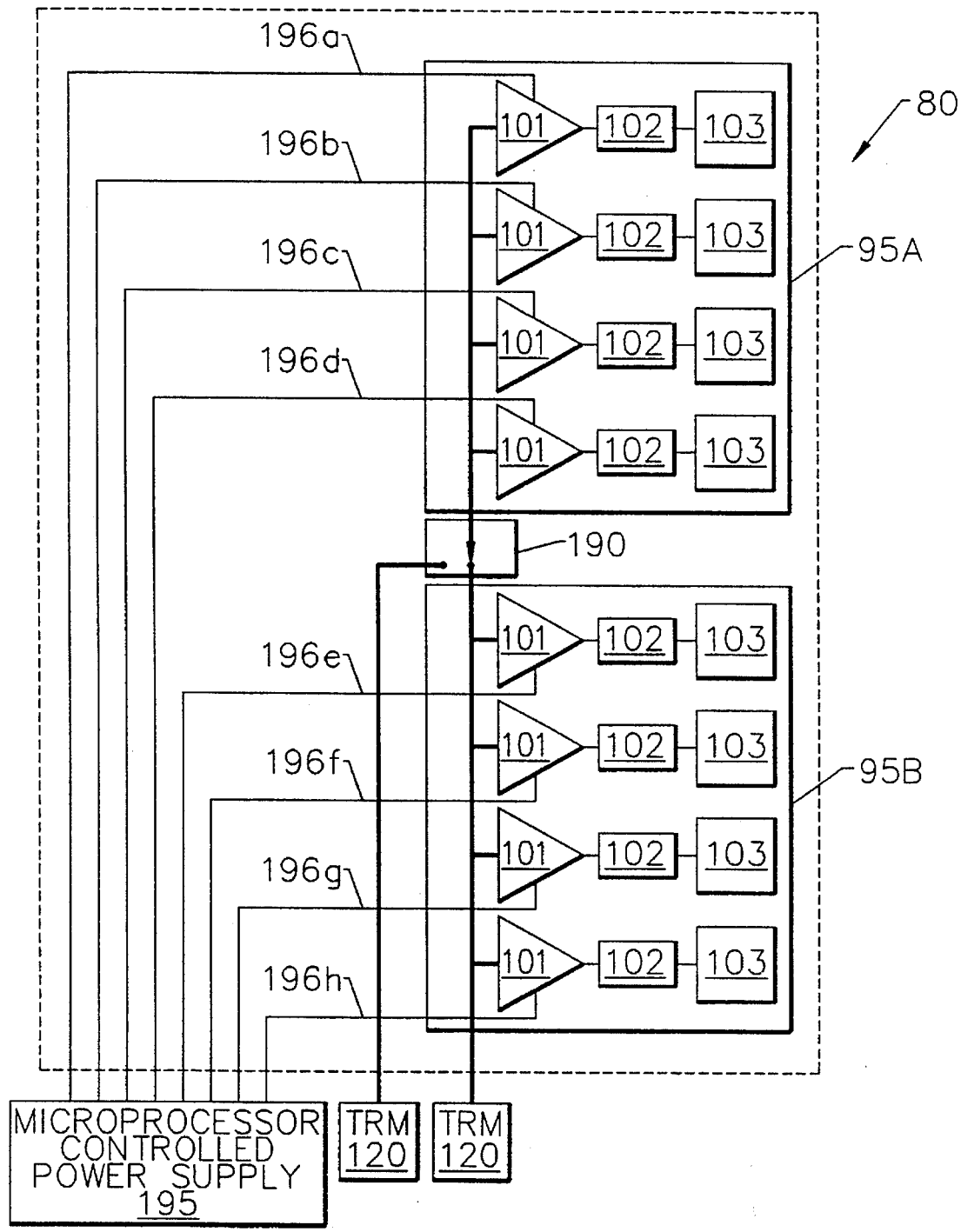
FIG. 12 is a schematic block diagram of an embodiment of the base station according to the invention illustrating a method to effect radiated power control.

It has been shown how to effect large changes in the transmit power of the antenna system above. However, practical downlink power control requires smaller increments of power adjustment. An embodiment of the invention shown in FIG. 12 illustrates a base station 80 for so doing. FIG. 12 shows the addition to the structure of FIG. 11 of a microprocessor-controlled power supply 195. For understanding, individual supply lines 196a–196h to each power amplifier 101 are shown. It is also possible to have individually addressable power supply lines served from a common bus supply. In either case, the controllable power supply 195 is capable of turning on and off the DC power to each individual power amplifier 103 in response to signals received from the ERI.

Figure 1:
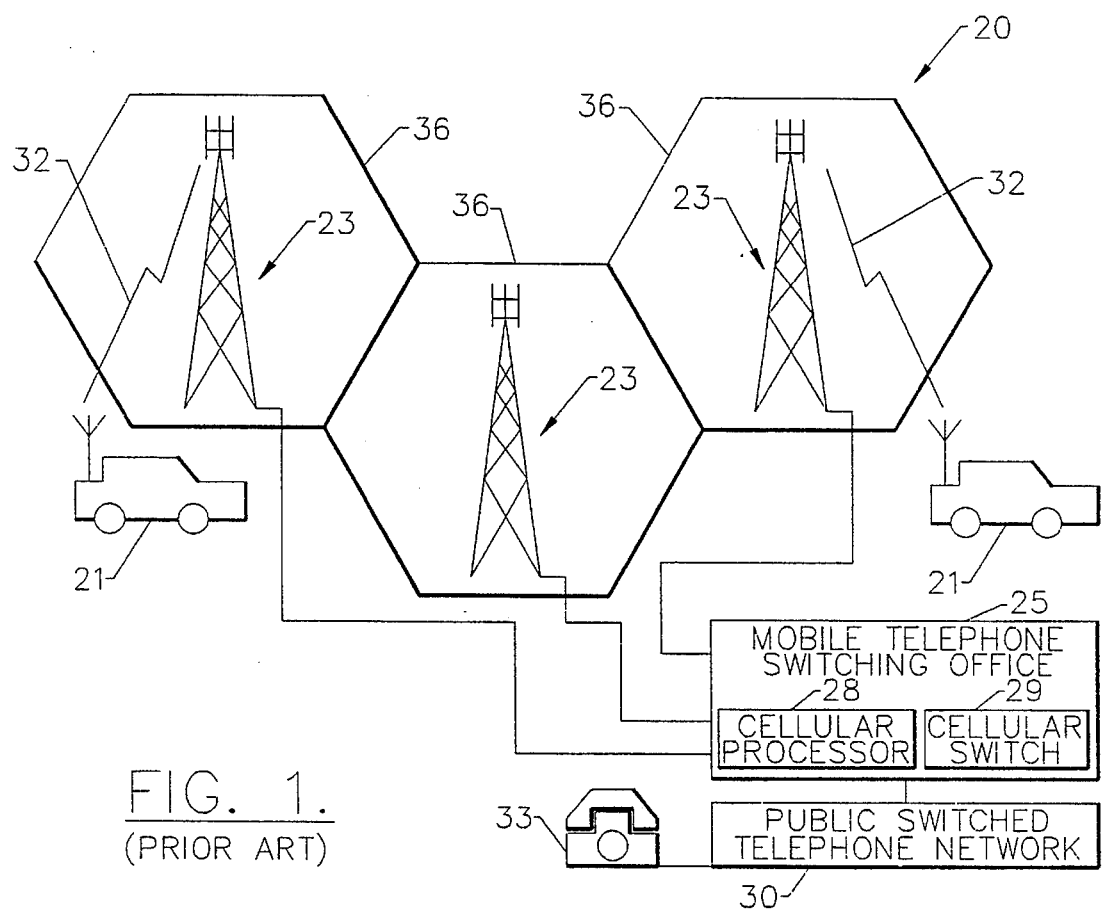
FIG. 1 is a schematic block diagram illustrating the basic components of a cellular communications system as in the prior art.
Figure 2:
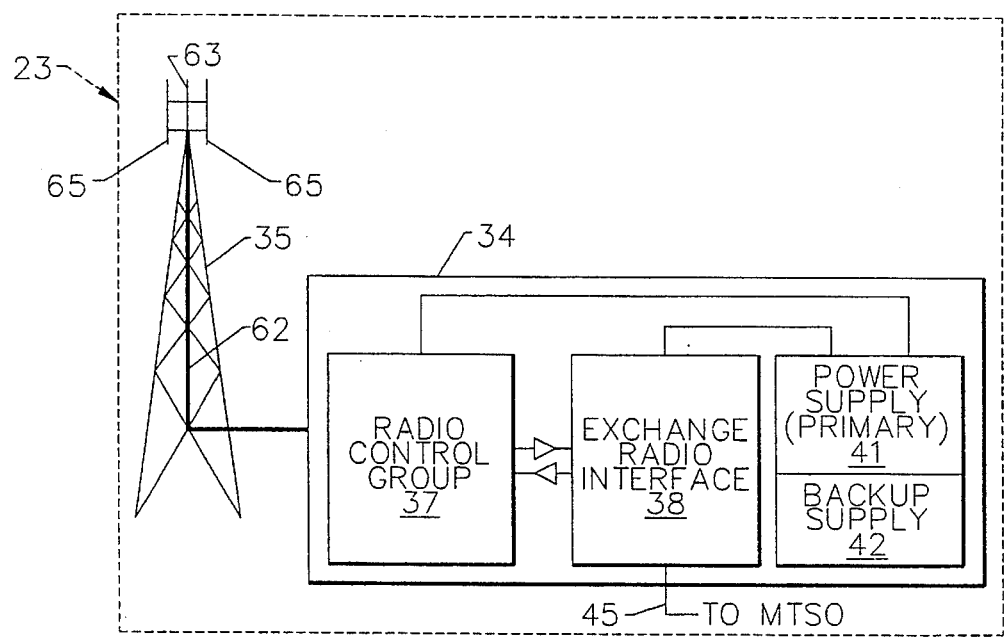
FIG. 2 is a schematic block diagram illustrating the functional components of a cellular communications base station as in the prior art.
Figure 3:
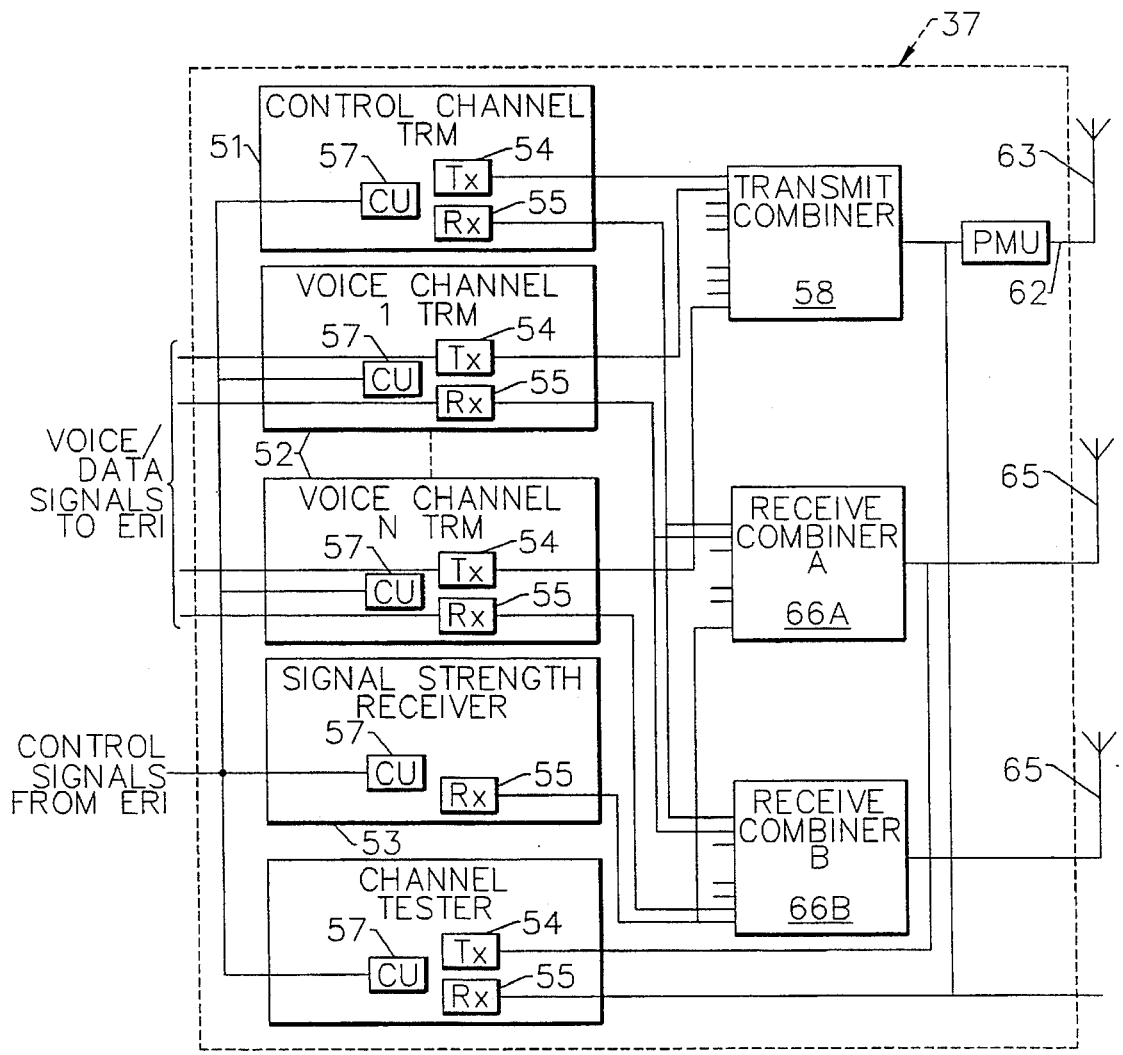
FIG. 3 is a schematic block diagram illustrating the functional elements of Radio Control Group of a base station as in the prior art.
Figure 4A:
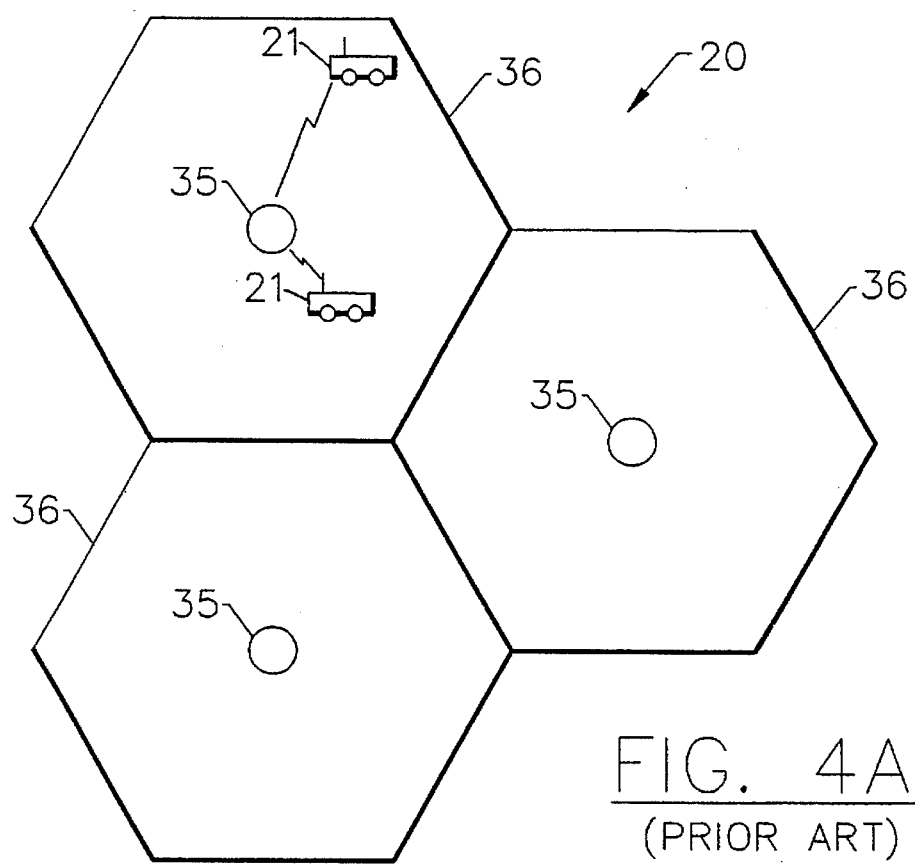
FIG. 4A is a schematic plan view illustrating an omnidirectional cellular pattern as in the prior art.
Figure 4B:
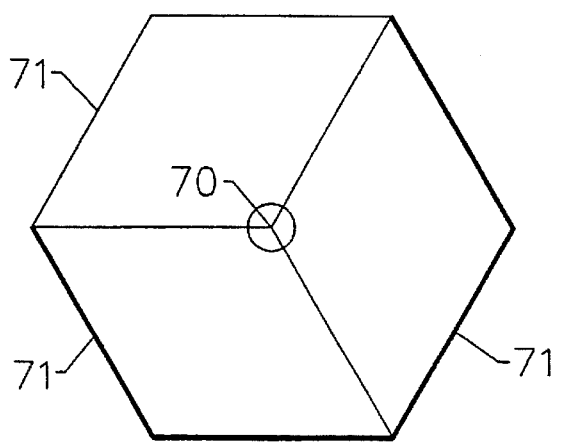
FIG. 4B is a schematic plan view illustrating a sectorized cellular pattern as in the prior art.
Figure 5A:
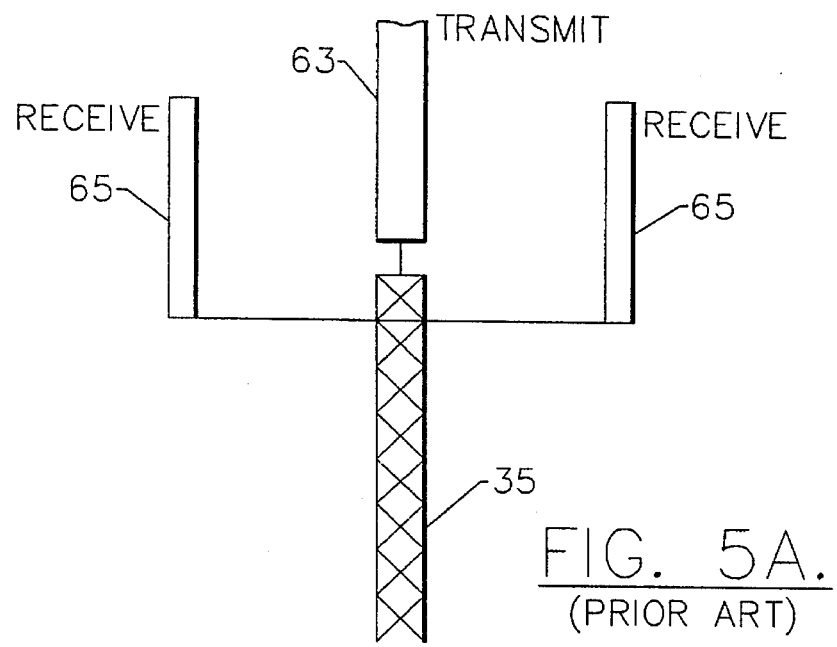
FIG. 5A is a schematic side view illustrating a typical cellular antenna system as in the prior art.
Figure 5B:
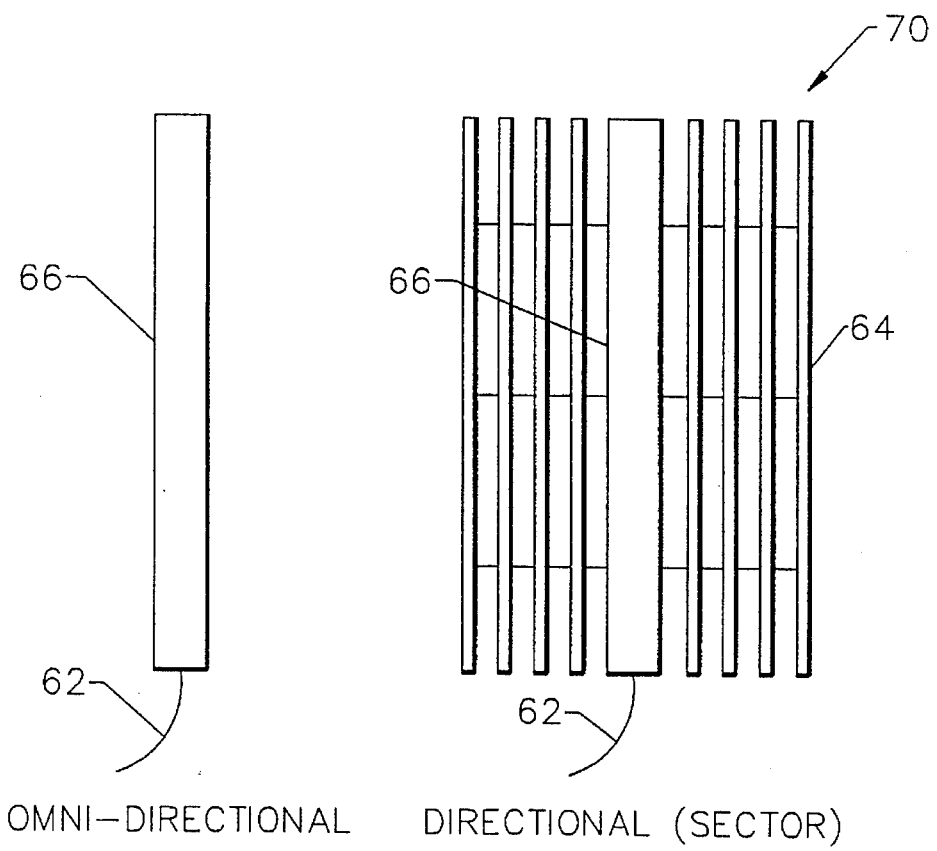
FIG. 5B is a schematic side view illustrating an omnidirectional antenna and a sector antenna as in the prior art.

In this example near and far mobile stations of FIG. 4A are in the coverage region of antenna system shown in FIG. 12; and both are being served by different time slots transmitted on the same frequency from the antenna system. Referring back also to FIG. 10, it is assumed further that the near mobile station occupies the time slot five of the TDMA frame 180 and the more distant mobile station occupies the time slot three of the TDMA frame. It can be shown that the output power (i.e., EIRP) of the antenna is proportional to the number of active elements squared by:

$$EIRP < N^2 (Gain)(P_T)$$

If, as before, each power amplifier is capable of producing a power output, PT of 600 milliWatts and that each element has a gain of 11 dBi then the radiated power values in TABLE 1 below can be constructed.

TABLE 1

| State | Power Supply | Activated? | | | | | | | |
|---|---|---|---|---|---|---|---|---|---|
| 1 | 196a | YES | YES | YES | YES | YES | YES | YES | YES |
| 2 | 196b | NO | YES | YES | YES | YES | YES | YES | YES |

TABLE 1-continued

| State | Power Supply | Activated? | | | | | | | |
|---|---|---|---|---|---|---|---|---|---|
| 3 | 196c | NO | NO | YES | YES | YES | YES | YES | YES |
| 4 | 196d | NO | NO | NO | YES | YES | YES | YES | YES |
| 5 | 196e | NO | NO | NO | NO | YES | YES | YES | YES |
| 6 | 196f | NO | NO | NO | NO | NO | YES | YES | YES |
| 7 | 196g | NO | NO | NO | NO | NO | NO | YES | YES |
| 8 | 196h | NO | NO | NO | NO | NO | NO | NO | YES |
| EIRP (Watts) | | 7.5 | 30.2 | 67.9 | 120.8 | 188.8 | 271.9 | 370.1 | 483.4 |

If, for example, it is required to transmit to the near mobile station with 30 watts, then during time slot five of the TDMA frame power supply lines 196a and 196b are activated and all others are deactivated. If it is required to transmit to the far mobile station with the full 480 watts, then during time slot three of the TDMA frame all of the supply lines are activated. Other combinations may, of course, be used as desired. If intermediate power levels are required they can be obtained by varying the number of power supply lines which are activated during any given time slot.

Figure 13:
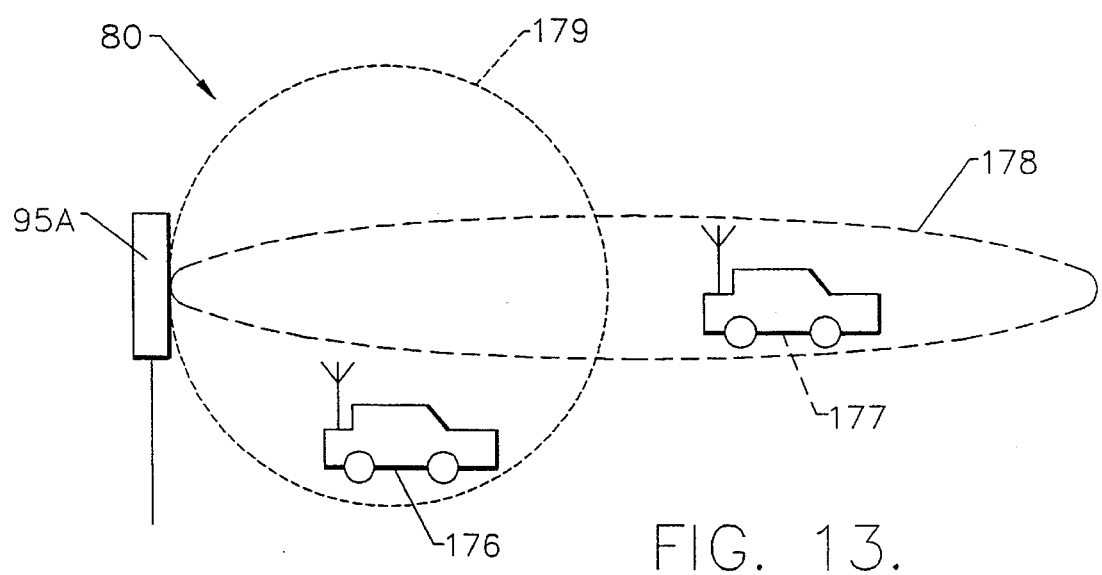
FIG. 13 is a schematic diagram of an embodiment of the base station according to the invention illustrating a method to effect coupled power by changing the beamshape of a phased array antenna.

As the number of elements in a phased array antenna is decreased, the radiation beamwidth increases. This has advantages which can be exploited in the present invention. In FIG. 13 is shown a phased array antenna 95A according to the present invention. When transmitting to more distant mobile stations such as mobile station 177, it is required to activate a relatively large number of the available active elements 103. By so doing, the vertical beamwidth of the antenna 95A and schematically illustrated by dashed line 178 is also decreased thereby providing a directive beam to the distant mobile station 177. When transmitting to nearer mobile station 176 fewer active elements 103 are required to be activated. Since mobile station 176 may be very close to the antenna tower, it would normally be in a poor coverage region for an antenna having beamwidth 178. However, since decreasing the number of active elements 103 in the antenna has the effect of broadening the vertical beamwidth indicated by dashed line 179, mobile station 176 is found to be in a region of acceptable coverage without having to resort to electronic or mechanical steering of the antenna 95A.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A base station for a cellular communications system including a plurality of coverage areas, said base station comprising:

radio channel generating means for generating a plurality of individual cellular radio channel signals each at a different frequency from one another;

at least four individual phased array antennas, positioned such that at least two of said at least four phased array antennas illuminate at least one common coverage area of the plurality of coverage areas; and linking means operatively connecting said radio channel generating means and said phased array antennas so that each individual phased array antenna transmits only one individual cellular radio channel signal.

2. A base station according to Claim 1 wherein each of said phased array antennas comprises a substrate and a plurality of radiating elements mounted thereon in a predetermined pattern.

3. A base station according to claim 2 wherein each radiating element comprises a stripline, and wherein said substrate comprises a circuit board.

4. A base station according to claim 2 further comprising a respective amplifier connected to each radiating element and mounted on said substrate so that each phased array antenna defines an active phased array antenna.

5. A base station according to claim 1 further comprising a tower having a lower portion adjacent ground level and an upper portion on which said phased array antennas are mounted, wherein said radio channel generating means is located adjacent the lower portion of said tower, and wherein said linking means comprises a plurality of interconnecting cables.

6. A base station according to claim 1 further comprising a tower having an upper portion on which said phased array antennas are mounted, and wherein said radio channel generating means is located on said tower.

7. A base station according to claim 1 further comprising a receive antenna positioned adjacent said phased array antennas for receiving from mobile units a plurality of individual radio channel signals each at a different frequency from one another.

8. A base station according to claim 7 wherein said receive antenna comprises a receive phased array antenna including a substrate and a plurality of receive antenna elements mounted thereon in a predetermined pattern.

9. A base station according to claim 8 further comprising:

combining network means mounted on said substrate of said receive antenna and connected to said plurality of receive antenna elements for coherently coupling said plurality of individual radio channel signals received thereby; and amplifier means mounted on said substrate of said receive antenna and connected to said combining network means for amplifying a signal therefrom.

10. A base station according to claim 1 wherein said radio channel generating means further comprises modulator means for modulating a plurality of radio frequency carriers with respective input signals to thereby generate said plurality of individual radio channel signals.

11. A base station for a cellular communications system, said base station comprising:

radio channel generating means for generating a plurality of individual radio channel signals each at a different frequency from one another;

a plurality of individual phased array antennas; and linking means operatively connecting said radio channel generating means and said phased array antennas so that each individual phased array antenna transmits only one individual radio channel signal;

wherein each of said phased array antennas comprises a substrate and a plurality of radiating elements mounted thereon in a predetermined pattern;

said base station further comprising signal quality receiver means for receiving a signal transmitted from a mobile unit relating to signal quality received at the mobile unit, and further comprising antenna power control means connected to said signal quality receiver means and said phased array antennas for selectively operating predetermined ones of said radiating elements in each respective phased array antenna responsive to said signal quality received at the mobile unit.

12. A base station for a cellular communications system, said base station comprising:

radio channel generating means for generating a plurality of individual radio channel signals each at a different frequency from one another;

a plurality of individual phased array antennas; and linking means operatively connecting said radio channel generating means and said phased array antennas so that each individual phased array antenna transmits only one individual radio channel signal;

wherein each of said phased array antennas comprises a substrate and a plurality of radiating elements mounted thereon in a predetermined pattern;

said base station further comprising signal strength means for sensing received signal strength from a mobile unit, and further comprising antenna power control means connected to said signal strength means and said phased array antennas for selectively operating predetermined ones of said radiating elements in each respective phased array antenna responsive to the sensed received signal strength.

13. A base station for a cellular communications system, said base station comprising:

radio channel generating means for generating a plurality of individual radio channel signals each at a different frequency from one another;

a plurality of individual phased array antennas;

linking means operatively connecting said radio channel generating means and said phased array antennas so that each individual phased array antenna transmits only one individual radio channel signal; and switch means connected between said radio channel generating means and said phased array antennas and movable between first and second positions so that said switch means when in the first position couples together two or more predetermined phased array antennas for increasing radiated antenna power for a respective radio channel signal, and so that said switch means when in the second position decouples the two or more predetermined phased array antennas for increasing radio channel capacity for the base station.

14. A base station for a cellular communications system including a plurality of coverage areas, said base station comprising:

radio channel generating means for generating a plurality of individual cellular radio channel signals each at a different frequency from one another; and at least four individual phased array antennas positioned such that at least two of said at least four phased array antennas illuminate at least one common coverage area of the plurality of coverage areas and connected to said cellular radio channel generating means so that each individual phased array antenna transmits only one individual radio channel signal.

15. A base station according to claim 14 wherein each of said phased array antennas comprises a substrate and a plurality of radiating elements mounted thereon in a predetermined pattern.

16. A base station according to claim 15 wherein each radiating element comprises a stripline, and wherein said substrate comprises a circuit board.

17. A base station according to claim 15 further comprising a respective amplifier connected to each radiating element and mounted on said substrate so that each phased array antenna defines an active phased array antenna.

18. A base station according to claim 14 further comprising a receive antenna positioned adjacent said phased array antennas for receiving from mobile units a plurality of individual radio channel signals each at a different frequency from one another.

19. A base station according to claim 18 wherein said receive antenna comprises a receive phased array antenna including a substrate and a plurality of receive antenna elements mounted thereon in a predetermined pattern.

20. A base station according to claim 19 further comprising:

combining network means mounted on said substrate of said receive antenna and connected to said plurality of receive antenna elements for coherently coupling said plurality of individual radio channel signals received thereby; and amplifier means mounted on said substrate of said receive antenna and connected to said combining network means for amplifying a signal therefrom.

21. A base station according to claim 14 wherein said radio channel generating means further comprises modulator means for modulating a plurality of radio frequency carriers with respective input signals to thereby generate said plurality of individual radio channel signals.

22. A base station for a cellular communications system, said base station comprising:

radio channel generating means for generating a plurality of individual radio channel signals each at a different frequency from one another; and a plurality of individual phased array antennas connected to said radio channel generating means so that each individual phased array antenna transmits only one individual radio channel signal;

wherein each of said phased array antennas comprises a substrate and a plurality of radiating elements mounted thereon in a predetermined pattern;

said base station further comprising signal quality receiver means for receiving a signal transmitted from a mobile unit relating to signal quality received at the mobile unit, and further comprising antenna power control means connected to said signal quality receiver means and said phased array antennas for selectively operating predetermined ones of said radiating elements in each respective phased array antenna responsive to said signal quality received at the mobile unit.

23. A base station for a cellular communications system, said base station comprising:

radio channel generating means for generating a plurality of individual radio channel signals each at a different frequency from one another; and a plurality of individual phased array antennas connected to said radio channel generating means so that each individual phased array antenna transmits only one individual radio channel signal;

wherein each of said phased array antennas comprises a substrate and a plurality of radiating elements mounted thereon in a predetermined pattern;

said base station further comprising signal strength means for sensing received signal strength from a mobile unit, and further comprising antenna power control means connected to said signal strength means and said phased array antennas for selectively operating predetermined ones of said radiating elements in each respective phased array antenna responsive to the sensed received signal strength.

24. A base station for a cellular communications system, said base station comprising:

radio channel generating means for generating a plurality of individual radio channel signals each at a different frequency from one another;

a plurality of individual phased array antennas connected to said radio channel generating means so that each individual phased array antenna transmits only one individual radio channel signal; and switch means connected between said radio channel generating means and said phased array antennas and movable between first and second positions so that said switch means when in the first position couples together two or more predetermined phased array antennas for increasing radiated antenna power for a respective radio channel signal, and so that said switch means when in the second position decouples the two or more predetermined phased array antennas for increasing radio channel capacity for the base station.

25. A base station for a cellular communications system, said base station comprising:

radio channel generating means for generating a plurality of radio channel signals;

at least one phased array antenna connected to said radio channel generating means, said at least one phased array antenna comprising a plurality of radiating elements;

signal quality receiver means for receiving a signal transmitted from a mobile unit relating to signal quality received at the mobile unit; and antenna power control means connected to said signal quality receiver means and said at least one phased array antenna for selectively operating predetermined ones of said radiating elements responsive to said signal quality received at the mobile unit.

26. A base station according to claim 25 wherein said at least one phased array antenna further comprises a substrate on which said plurality of radiating elements are mounted.

27. A base station according to claim 26 wherein each radiating element comprises a stripline, and wherein said substrate comprises a circuit board.

28. A base station according to claim 26 further comprising a respective amplifier connected to each radiating element and mounted on said substrate so that said at least one phased array antenna defines an active phased array antenna.

29. A base station according to claim 28 wherein said antenna power control means comprises a microprocessor operating under stored program control to selectively operate predetermined ones of the amplifiers.

30. A base station for a cellular communications system including a plurality of coverage areas, said base station comprising:

radio channel generating means for generating a plurality of individual cellular radio channel signals each at a different frequency from one another, said radio channel generating means further comprising multiplexing means for time division multiplexing a plurality of input signals for each cellular radio channel signal;

at least four individual phased array antennas positioned such that at least two of said at least four phased array antennas illuminate at least one common coverage area of the plurality of coverage areas; and linking means operatively connecting said radio channel generating means and said phased array antennas so that each individual phased array antenna transmits only one individual cellular radio channel signal.

31. A base station according to claim 30 wherein said multiplexing means comprises means for multiplexing each input signal into a respective time slot in a repetitive multiplex frame for a respective radio channel signal.

32. A base station according to claim 30 wherein said multiplexing means comprises means for multiplexing each input signal into predetermined time slot in respective repetitive multiplex frames for a plurality of predetermined radio channel signals.

33. A base station according to claim 32 further comprising a receive antenna positioned adjacent said phased array antennas for receiving from mobile units a plurality of individual radio channel signals each at a different frequency from one another.

34. A base station according to claim 30 wherein each of said phased array antennas comprises a substrate and a plurality of radiating elements mounted thereon in a predetermined pattern.

35. A base station according to claim 34 wherein each radiating element comprises a stripline, and wherein said substrate comprises a circuit board.

36. A base station according to claim 34 further comprising a respective amplifier connected to each radiating element and mounted on said substrate so that each phased array antenna defines an active phased array antenna.

37. A base station according to claim 32 wherein said radio channel generating means further comprises modulator means for modulating a plurality of radio frequency carriers with respective information signals to thereby generate said plurality of individual radio channel signals.

38. A base station for a cellular communications system, said base station comprising:

radio channel generating means for generating a plurality of individual radio channel signals each at a different frequency from one another, said radio channel generating means further comprising multiplexing means for time division multiplexing a plurality of input signals for each radio channel signal;

a plurality of individual phased array antennas; and linking means operatively connecting said radio channel generating means and said phased array antennas so that each individual phased array antenna transmits only one individual radio channel signal;

wherein each of said phased array antennas comprises a substrate and a plurality of radiating elements mounted thereon in a predetermined pattern;

said base station further comprising signal quality receiver means for receiving a signal transmitted from a mobile unit relating to signal quality received at the mobile unit, and further comprising antenna power control means connected to said signal quality receiver means and said phased array antennas for selectively operating predetermined ones of said radiating elements in each respective phased array antenna responsive to said signal quality received at the mobile unit.

39. A base station according to claim 33 wherein said receive antenna comprises a receive phased array antenna including a substrate and a plurality of receive antenna elements mounted thereon in a predetermined pattern.

40. A base station for a cellular communications system, said base station comprising:

radio channel generating means for generating plurality of individual radio channel signals each at a different frequency from one another, said radio channel generating means further comprising multiplexing means for time division multiplexing a plurality of input signals for each radio channel signal;

a plurality of individual phased array antennas; and linking means operatively connecting said radio channel generating means and said phased array antennas so that each individual phased array antenna transmits only one individual radio channel signal;

wherein each of said phased array antennas comprises a substrate and a plurality of radiating elements mounted thereon in a predetermined pattern;

said base station further comprising signal strength means for sensing received signal strength from a mobile unit, and further comprising antenna power control means connected to said signal strength means and said phased array antennas for selectively operating predetermined ones of said radiating elements in each respective phased array antenna responsive to the sensed received signal strength.

41. A base station for a cellular communications system, said base station comprising:

radio channel generating means for generating a plurality of individual radio channel signals each at a different frequency from one another, said radio channel generating means further comprising multiplexing means for time division multiplexing a plurality of input signals for each radio channel signal;

a plurality of individual phased array antennas; and linking means operatively connecting said radio channel generating means and said phased array antennas so that each individual phased array antenna transmits only one individual radio channel signal;

wherein said multiplexing means comprises means for multiplexing each input signal into predetermined time slot in respective repetitive multiplex frames for a plurality of predetermined radio channel signals;

said base station further comprising switch means connected between said radio channel generating means and said phased array antennas and movable between first and second positions so that said switch means when in the first position couples together two or more predetermined phased array antennas for increasing radiated antenna power for a respective radio channel signal, and so that said switch means when in the second position decouples the two or more predetermined phased array antennas for increasing radio channel capacity for the base station.

42. A base station for a cellular communications system, said base station comprising:

radio channel generating means for generating a plurality of radio channel signals;

a plurality of phased array antennas connected to said radio channel generating means; and switch means connected between said radio channel generating means and said phased array antennas and movable between first and second positions so that said switch means when in the first position couples together two or more predetermined phased array antennas for increasing radiated antenna power for a respective radio channel signal, and so that said switch means when in the second position decouples the two or more predetermined phased array antennas for increasing radio channel capacity for the base station.

43. A base station according to claim 42 wherein each of said phased array antennas comprises a substrate and a plurality of radiating elements mounted thereon in a predetermined pattern.

44. A base station according to claim 43 further comprising signal quality receiver means for receiving a signal transmitted from a mobile unit relating to signal quality received at the mobile unit, and further comprising antenna power control means connected to said signal quality receiver means and said phased array antennas for selectively operating predetermined ones of said radiating elements in each respective phased array antenna responsive to said signal quality received at the mobile unit.

45. A base station according to claim 43 further comprising signal strength means for sensing received signal strength from a mobile unit, and further comprising antenna power control means connected to said signal strength means and said phased array antennas for selectively operating predetermined ones of said radiating elements in each respective phased array antenna responsive to the sensed received signal strength.

46. A base station according to claim 43 wherein each radiating element comprises a stripline, and wherein said substrate comprises a circuit board.

47. A base station according to claim 46 further comprising a respective amplifier connected to each radiating element and mounted on said substrate so that each phased array antenna defines an active phased array antenna.

48. A base station according to claim 42 wherein said radio channel generating means further comprises modulator means for modulating a plurality of radio frequency carriers with respective input signals to thereby generate said plurality of individual radio channel signals.

49. A method for operating a base station for a cellular radio communications system of the type including a plurality of coverage areas, the base station of the type including at least four individual phased array antennas positioned such that at least two of the at least four phased array antennas illuminate at least one common coverage area of the plurality of coverage areas, said method comprising the steps of:

generating a plurality of individual cellular radio channel signals each at a different frequency from one another; and operating each individual phased array antenna to transmit only one individual cellular radio channel signal.

50. A method according to claim 49 further comprising receiving from mobile units a plurality of individual radio channel signals each at a different frequency from one another.

51. A method according to claim 49 wherein the step of generating the plurality of individual radio channel signals comprises modulating a plurality of radio frequency carriers with respective input signals.

52. A method according to claim 49 wherein the step of generating a plurality of individual radio channels comprises time division multiplexing a plurality of input signals into predetermined time slots of repetitive multiplex frames.

53. A method for operating a base station for a cellular radio communications system of the type including a plurality of individual phased array antennas, said method comprising the steps of:

generating a plurality of individual radio channel signals each at a different frequency from one another; and operating each individual phased array antenna to transmit only one individual radio channel signal;

wherein each of the phased array antennas includes a plurality of radiating elements, and further comprising the step of receiving a signal transmitted from a mobile unit relating to signal quality received at the mobile unit, and selectively operating predetermined ones of the radiating elements in each respective phased array antenna responsive to said signal quality received at the mobile unit.

54. A method for operating a base station for a cellular radio communications system of the type including a plurality of individual phased array antennas, said method comprising the steps of:

generating a plurality of individual radio channel signals each at a different frequency from one another;

operating each individual phased array antenna to transmit only one individual radio channel signal; and coupling together two or more predetermined phased array antennas for increasing radiated antenna power for a respective radio channel signal.

55. A method according to claim 54 further comprising the steps of later decoupling the two or more predetermined phased array antennas, and operating the two or more predetermined phased array antennas with respective different radio frequency channels for increasing radio channel capacity for the base station.

56. A method for operating a base station for a radio cellular radio communications system including at least one phased array antenna comprising a plurality of radiating elements, the method comprising the steps of:

generating a plurality of radio channel signals and transmitting the plurality of radio channel signals from the at least one phased array antenna;

receiving a signal transmitted from a mobile unit relating to signal quality received at the mobile unit; and selectively operating predetermined ones of the radiating elements responsive to signal quality received at the mobile unit.

57. A method according to claim 56 wherein the at least one phased array antenna further comprises respective amplifiers associated with each of the radiating elements, and wherein the step of selectively operating predetermined ones of the radiating elements comprises selectively controlling power delivered to respective amplifiers.

58. A method for operating a base station for a cellular radio communications system of the type including a plurality of phased array antennas, the method comprising the steps of:

generating a radio channel signal and delivering same to a plurality of predetermined phased array antennas coupled together for increasing radiated antenna power for the radio channel signal; and later decoupling the plurality of predetermined phased array antennas and operating the predetermined phased array antennas with respective different radio frequency channels for increasing radio channel capacity for the base station.

* * * * *